United States Patent
Rodeghiero

(10) Patent No.: US 7,264,078 B2
(45) Date of Patent: Sep. 4, 2007

(54) CALIBRATION METHOD FOR INTER-AXLE DIFFERENTIAL CONTROL SYSTEM

(75) Inventor: Reno Antonio Rodeghiero, Hudson, IA (US)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 11/054,964

(22) Filed: Feb. 10, 2005

(65) Prior Publication Data

US 2006/0175113 A1 Aug. 10, 2006

(51) Int. Cl.
*B60K 17/34* (2006.01)
*B60K 17/354* (2006.01)

(52) U.S. Cl. ............ 180/245; 180/197; 180/233; 180/248

(58) Field of Classification Search ......... 180/197, 180/233, 247–249; 701/67–70, 82–90
See application file for complete search history.

(56) References Cited

U.S. PATENT DOCUMENTS

| | | | |
|---|---|---|---|
| 4,681,185 A | 7/1987 | Hoernig et al. ............ 180/247 |
| 4,825,368 A | 4/1989 | Itoh et al. ................. 364/424.1 |
| 4,895,217 A | 1/1990 | Hueckler et al. .......... 180/233 |
| 5,075,854 A * | 12/1991 | Imaseki et al. ............ 701/36 |
| 5,225,984 A * | 7/1993 | Nakayama ................. 701/36 |
| 5,270,930 A | 12/1993 | Ito et al. ................... 364/424.1 |
| 5,301,769 A * | 4/1994 | Weiss ........................ 180/249 |
| 5,492,194 A | 2/1996 | McGinn et al. ........... 180/233 |
| 5,631,829 A * | 5/1997 | Takasaki et al. .......... 701/69 |
| 5,710,565 A | 1/1998 | Shirai et al. ............... 342/70 |
| 5,742,917 A * | 4/1998 | Matsuno .................... 701/69 |
| 2003/0216212 A1 | 11/2003 | Rodeghiero ............... 475/295 |

\* cited by examiner

*Primary Examiner*—Lesley D. Morris
*Assistant Examiner*—Marc A. Scharich

(57) ABSTRACT

A vehicle includes steerable front wheels, an interaxle differential for transmitting torque from an engine to the front wheels and to rear wheels. The differential includes a controllable clutch operable to control a ratio of front wheel speed to rear wheel speed. A control unit controls the clutch as a function of sensed steering angles and stored information including steering angles and corresponding front to rear wheel speed ratio values. The control unit is automatically calibrated. The control unit periodically obtains steering angle values, periodically obtains front and rear wheel speed values, periodically generates new front to rear wheel speed ratio values, and replaces one of the stored front to rear wheel speed ratio values with one of the new ratio values if the steering angle values indicate that the vehicle has been in a straight ahead travel mode for at least a certain time period.

16 Claims, 4 Drawing Sheets

| COL. 1 | COL. 2 | COL. 3 | COL. 4 |
|---|---|---|---|
| STEER ANGLE | FRONT/REAR OPTIMUM SPEED RATIO | FRONT SLIP LIMIT MAX SPEED RATIO | REAR SLIP LIMIT MAX SPEED RATIO |
| 0 | 1.00 | 1.08 | .95 |
| 5 | 1.00 | 1.08 | .95 |
| 10 | 1.02 | 1.10 | .95 |
| 15 | 1.04 | 1.12 | .95 |
| 20 | 1.06 | 1.14 | .95 |
| 25 | 1.10 | 1.20 | .95 |
| 30 | 1.16 | 1.28 | .95 |
| 35 | 1.22 | 1.34 | .95 |
| 40 | 1.31 | 1.46 | .95 |
| 45 | 1.41 | 1.60 | .95 |

CALIBRATION METHOD FOR INTER-AXLE DIFFERENTIAL CONTROL SYSTEM

BACKGROUND

The present invention relates to a control system for an inter-axle differential, and more particularly, to a method of calibrating such a control system.

In order to improve turning radius and traction during turning, front wheel drive tractors have been provided with actively controlled slip interaxle differentials. U.S. Pat. No. 5,301,769, issued to Weiss on 12 Sep. 1994, describes a vehicle power distribution and control system wherein the slip of an inter-axle differential is controlled as a function of steering angle of the steerable front wheels and wheel rotation speed.

U.S. patent application Ser. No. 09/151,348 filed 20 May 2002 (docket no. 15630-US), now abandoned, describes a control system for controlling the modulating clutch of an interaxle differential which transmits torque from an engine driven transmission to a front axle and to a rear axle. The differential includes a planetary gear set coupled to the modulating clutch. The modulating clutch is coupled between a pair of the planetary gear elements, and is used to bring the front to rear speed differential within desired limits. The control system operates in response to sensed steering angle, sensed front wheel speed, sensed rear wheel speed and calibration values stored in a look-up table. From these factors the control system determines a desired maximum speed difference between the front and rear wheels, and controls the differential to keep the front to rear speed ratio within the desired limit. The clutch is modulated to "feather" the differential action to deviate from "normal" differential action when the front (or rear) wheels are on slick ground and the rear wheels have good traction. The primary reason for this condition is when the load is such that the tractor weight is shifted to the rear wheels and the front end is coming off the ground.

However, different tractors may have different tires, and a control relationship which works well for one tractor may not function optimally for a tractor with different tires. As a result, the above-described differential control system had to be manually calibrated and the look-up table values determined for optimum operation for each individual tractor. But, conditions and sensor responses also change over time. It is desired to have a differential clutch control system which automatically adapts to different unique vehicles and which adapts to changes in vehicles and sensors.

SUMMARY

Accordingly, an object of this invention is to provide a differential slip control system which is automatically calibrated.

These and other objects are achieved by the present invention, wherein a vehicle has steerable front wheels, an interaxle differential for transmitting torque from an engine to the front wheels and to rear wheels. The differential includes a controllable device operable to control a ratio of front wheel speed to rear wheel speed. The invention includes a front wheel speed sensor, a rear wheel speed sensor, a steering angle sensor, and a control unit for controlling the controllable device as a function of sensed steering angles and stored information including steering angles and corresponding front to rear wheel speed ratio values. The invention involves a method of calibrating the control unit. The control unit periodically obtains steering angle values from the steering angle sensor, periodically obtains front and rear wheel speed values from the speed sensors, periodically generates new front to rear wheel speed ratio values from the obtained speed values, and replaces one of the stored front to rear wheel speed ratio values with one of the new ratio values if the steering angle values indicate that the vehicle has been in a straight ahead travel mode for at least a certain time period.

As a result, the system automatically calibrates the steering angle sensor and the front to rear wheel speed ratio values when the vehicle is traveling straight ahead faster than a threshold speed, and it then uses these calibration results to automatically calibrate the front to rear speed ratios for non-straight ahead conditions.

DETAILED DESCRIPTION

Figures 1, 2:
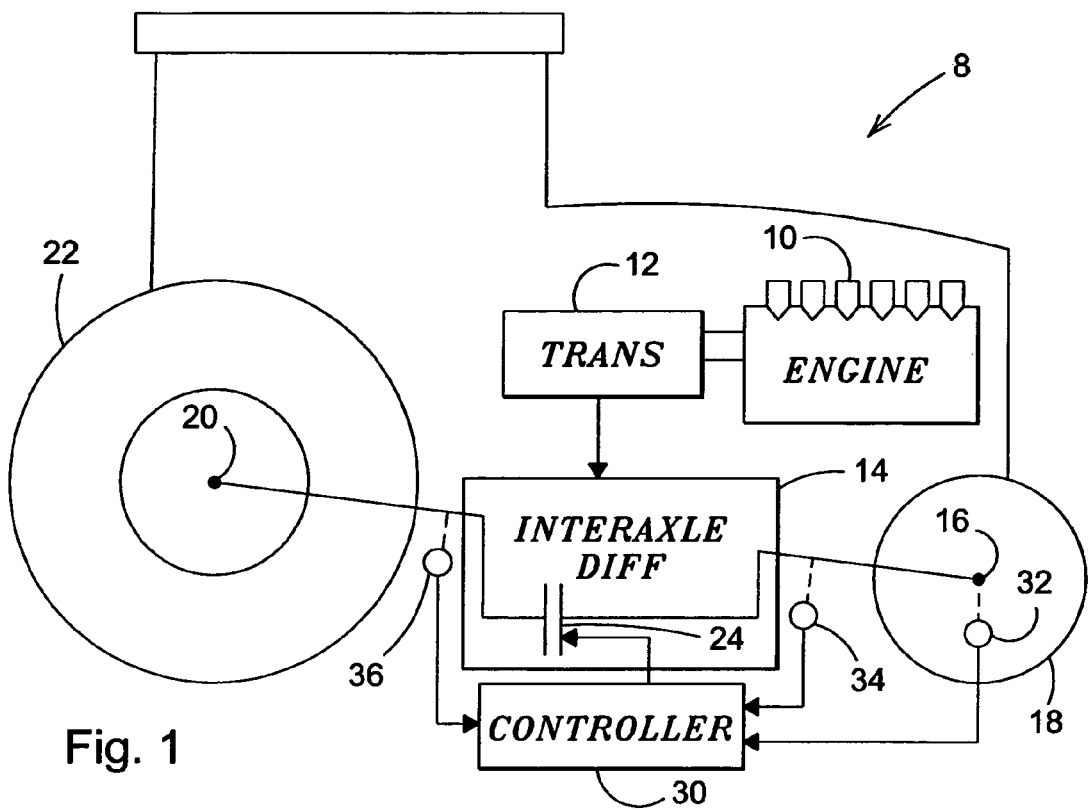
FIG. 1 is a simplified schematic diagram of a differential control system of the present invention.
FIG. 2 is a look up table representation of information stored in the controller of FIG. 1.

FIG. 1 shows a tractor 8 with an engine 10 which drives a transmission 12. An interaxle differential 14 transmits torque from transmission 12 to a front axle 16 and front wheels 18, and to a rear axle 20 and rear wheels 22. Differential 14 receives torque from the transmission 12 and distributes the torque to the front and rear wheels 18, 22. Differential 14 includes a modulating or lockup clutch 24 which can modulate the front-to-rear torque distribution from the (30-70) design proportion to a full lockup condition wherein there is no differential action.

An electronic control unit (ECU) 30 receives a steering angle signal from steering angle sensor 32, a front wheel speed signal from front wheel speed sensor 34 and a rear wheel or tractor speed signal from rear wheel speed sensor 36. ECU 30 provides a control signal to clutch 24, and the control signal is determined as a function of the sensed steering angle and whether or not the front 18 or rear wheels 22 are turning at the desired speed in relation to each other.

Steering angle versus differential speed relationships are stored in a memory (not shown) of the ECU 30, such as in a lookup table 40, a simplified example of which is shown in FIG. 2. The left-most column (Col. 1) of this table includes of a plurality of steering angle values. The next column (Col. 2) includes a plurality of corresponding theoretical optimal front to rear speed ratio values. If the measured front to rear wheel speed ratio is greater than optimal, then the front wheels have excessive slip. The next column (Col. 3) contains a plurality of corresponding front slip limit maximum speed ratio values which represent the allowable limit of front wheel slip. If the front wheel slip exceeds the limit, the ECU causes the differential clutch 24 to engage with just enough torque to bring the front to rear speed ratio to within the slip limit.

If the measured front to rear speed ratio is less than the optimal amount, then the rear wheels have excessive slip. Column 4 of FIG. 2 establishes the allowable limit of rear wheel slip. If the rear wheel slip exceeds the limit, the clutch 24 engages with just enough torque to bring the front to rear speed ratio within the slip limit.

The ECU 30 periodically executes an algorithm which includes subroutines 100, 200 and 300 represented by FIGS.

3-5. The conversion of these flow charts into a standard language for implementing the algorithm described by the flow chart in a digital computer or microprocessor, will be evident to one with ordinary skill in the art. Although not shown in the flow charts, the algorithm implements software timers: a straight ahead position timer, a straight ahead ratio timer, and value upgrade timers for steering angles 0, 5, 10, 15, 20, 25, 30, 35, 40 and 45 degrees which are stored in the lookup table.

Figure 3:
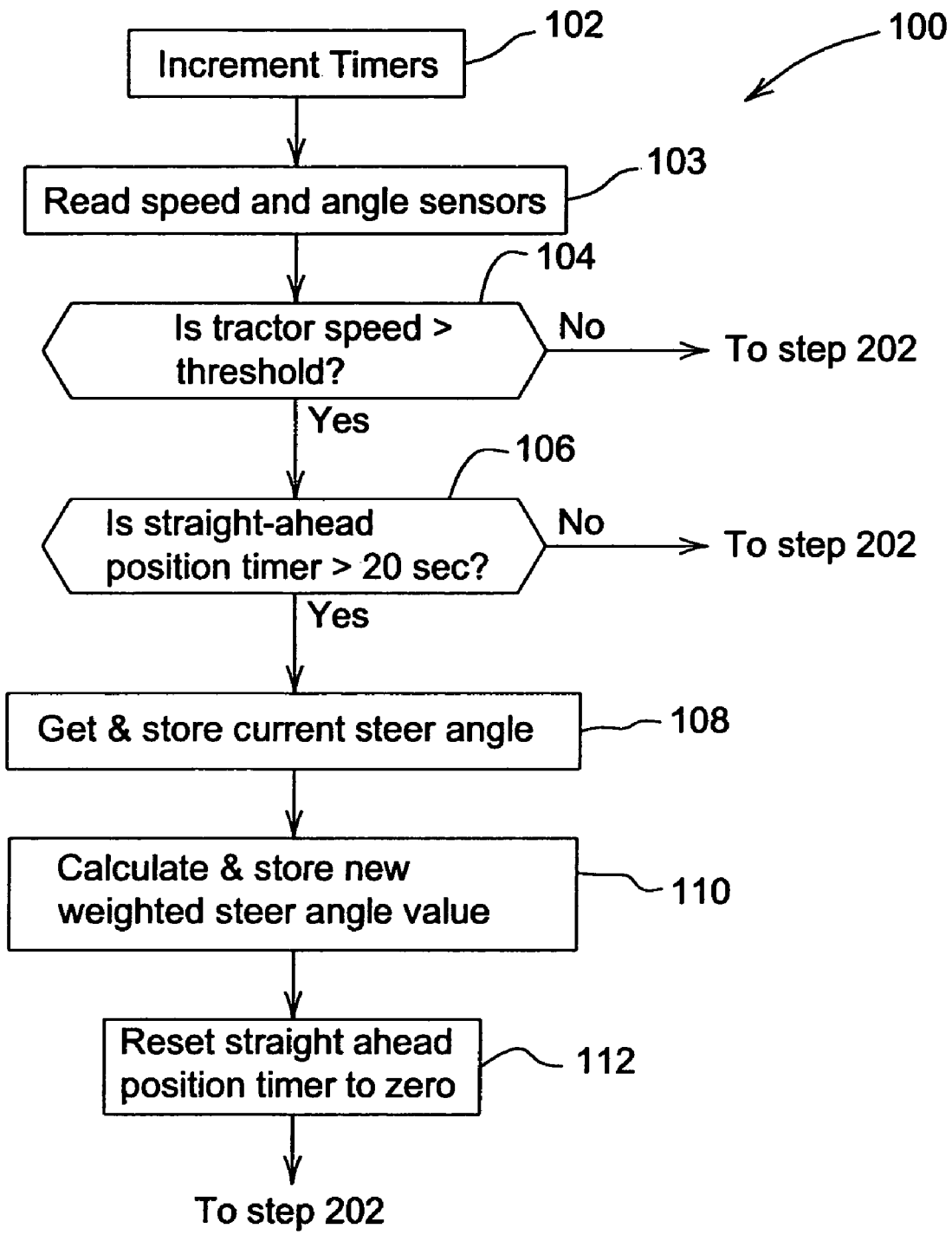
FIGS. 3-5 are logic flow diagrams illustrating algorithm subroutines executed by the controller of FIG. 1.

Referring now to FIG. 3, algorithm 100 starts with step 102 which increments the various timers just described. Step 103 reads the steering angle from sensor 32 and reads the speed from wheel speed sensors 34 and 36. Then step 104 compares tractor speed to a threshold speed, such as 20 kph. If tractor speed is greater than the threshold the algorithm proceeds to step 106, else to step 202 of subroutine 200.

Step 106 checks the straight ahead steering position timer to determine whether or not the tractor has been in a straight ahead steering condition for more than a threshold time period such as 20 seconds. If not, the algorithm proceeds to step 202, else the algorithm proceeds to step 108.

Step 108 gets the current sensed steer angle from step 103 and stores a Current Steer Angle value in a memory of the ECU.

Step 110 calculates a new weighted straight ahead steer angle according to the following equation: New Weighted Straight Ahead Steer Angle=(Current Steer Angle×99+New Weighted Steer Angle)/100.

Thus, the New Weighted Straight Ahead Steer Angle value is a weighted average of the previous stored straight ahead steer angle and the current sensed steering angle.

Step 112 resets the straight ahead steering angle timer to zero, after which subroutine 200 is executed.

Figure 4:
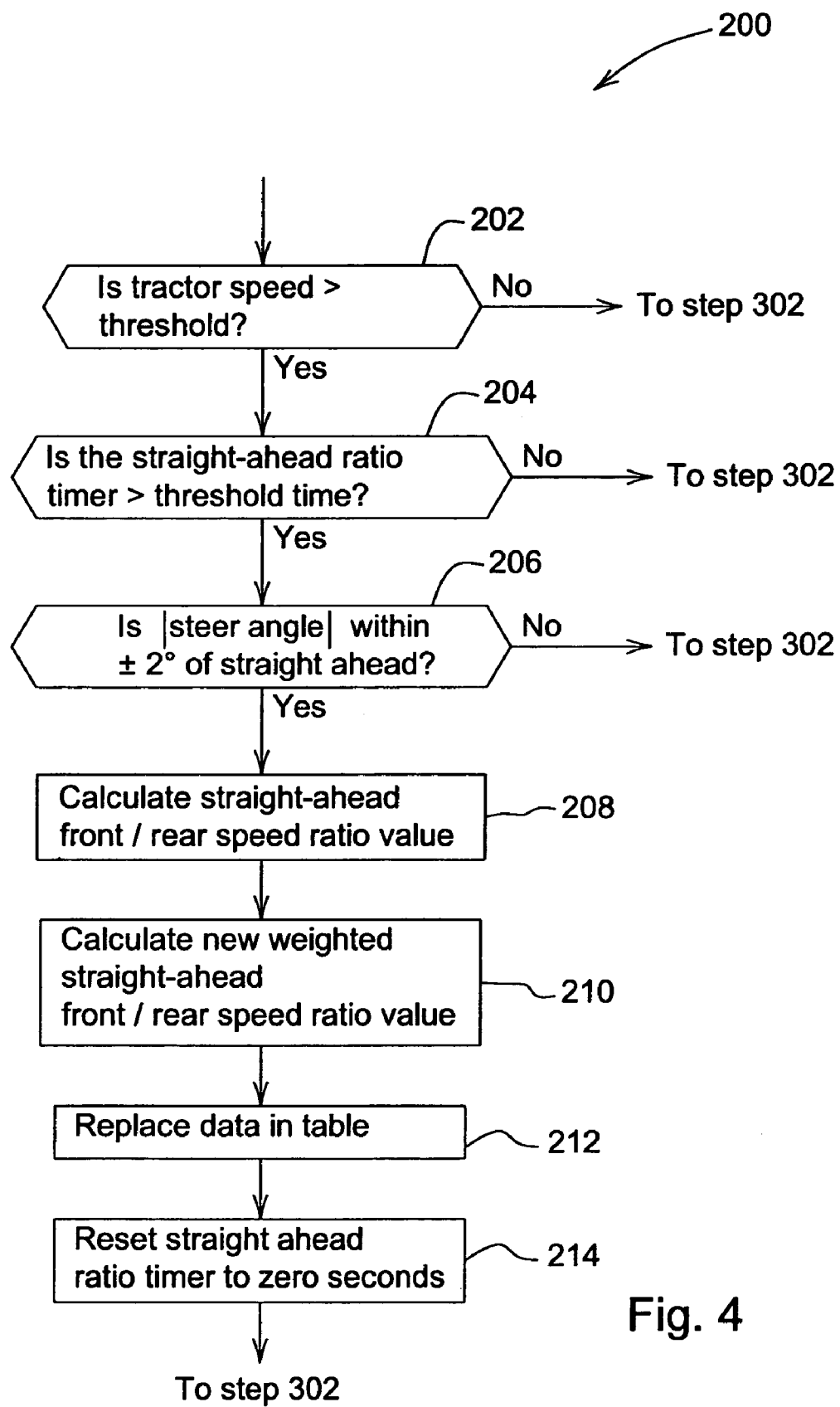

Referring now to FIG. 4, algorithm 200 starts with step 202 where sensed tractor speed is compared to a threshold speed, such as 20 kph. If tractor speed is greater than the threshold the algorithm proceeds to step 204, else to step 302 of subroutine 300.

Step 204 examines the straight ahead ratio timer and determines whether or not more than 20 seconds have expired since the last time that timer was reset. If not, the algorithm proceeds to step 302, else the algorithm proceeds to step 206.

Step 206 determines whether or not the current sensed steer angle from sensor 32 is within a small angle (such as +/−2 degrees) of the stored weighted straight ahead steer angle value (from step 110). If not, the algorithm proceeds to step 302, else the algorithm proceeds to step 208.

Step 208 gets and stores the current front wheel speed and rear wheel speed from sensors 34 and 36, and calculates and stores a current straight front/rear speed ratio value.

Step 210 calculates a new weighted straight front/rear speed ratio value according to the following equation:

New Weighted Straight Ahead Speed Ratio=(Current Straight Speed Ratio ×99+New Weighted Straight Speed Ratio)/100.

Thus, the New Weighted Straight Speed Ratio is a weighted average of the previous stored New Weighted Straight Speed Ratio and the current sensed straight speed ratio.

Step 212 replaces the stored straight ahead (zero steer angle) front to rear wheel speed ratio value. This value is the "base ratio" which corresponds to the front/rear optimum speed ratio of 1.00 located in row 1, col. of the table 40. This operation is performed if the vehicle speed is greater than a threshold speed such as 20 kph, if the steering angle values indicate that the vehicle has been in a straight ahead travel mode for at least a certain time period (as determined by the straight ahead ratio timer, and if the steering angle indicates substantially straight ahead travel.

Step 214 resets the straight ahead ratio timer to zero and directs the algorithm to step 302 of subroutine 300.

Figure 5:
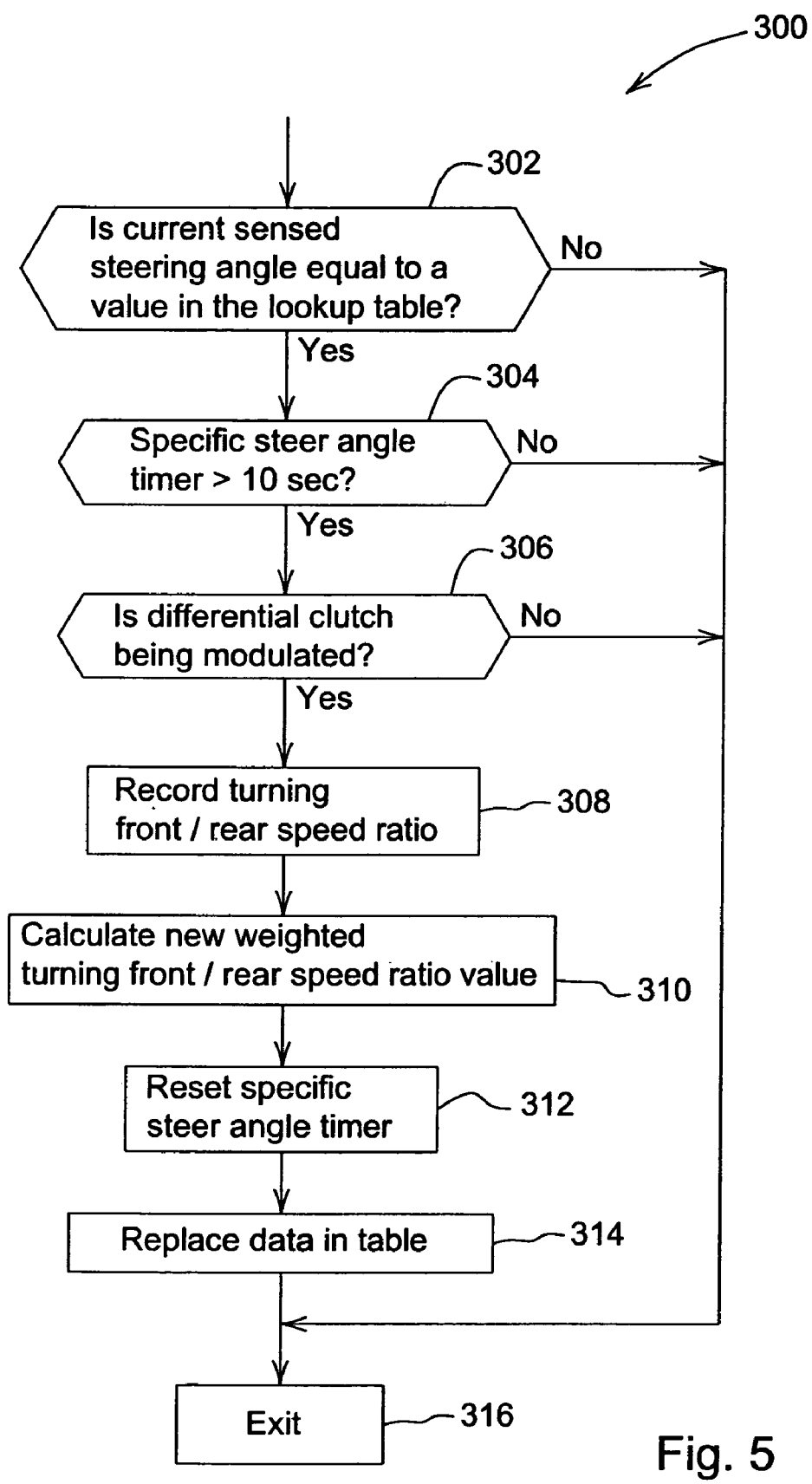

Referring now to FIG. 5, algorithm 300 starts with step 302 which determines whether or not the current steering angle from sensor 32 is the same as one of the non-straight ahead steering angle values stored in col. 1 of the lookup table 40 of FIG. 2. If not, the algorithm is exited at step 316, else the algorithm proceeds to step 304.

Step 304 examines the value upgrade timer for the lookup table steer angle, and determines whether or not more than 10 seconds have expired since the last time that timer was reset. If not, the algorithm returns to step 302, else the algorithm proceeds to step 306. This prevents a specific steer angle front/rear speed ratio value in the table from being updated more frequently than, for example, once every ten seconds.

Step 306 directs the algorithm to exit at step 316 if the clutch 24 is currently being modulated. If not, the algorithm proceeds to step 308.

Step 308 calculates and stores a turning front/rear speed ratio value.

Step 310 calculates a new weighted optimum front/rear speed ratio value according to the following equation: New Weighted Turning Speed Ratio=(Current Turning Speed Ratio×99+New Weighted Turning Speed Ratio)/100.

Thus, the New Weighted Turning Speed Ratio is a weighted average of the previous stored New Weighted Turning Speed Ratio and the current sensed turning speed ratio.

Step 312 resets the timer for the specific steer angle value identified in step 302.

Step 314 operates to replace the value stored in col. 2 of the look-up table of FIG. 2 with the new value determined by step 310. The value replaced will be the value corresponding to the steering angle determined in step 302.

Finally, the algorithm exits at step 316.

As a result, the above described system recognizes and utilizes the fact that at higher speeds, such as 20 kph, a tractor will be operated in a straight ahead mode most of the time. This permits the system to calibrate the straight ahead (zero angle) state of the steering angle sensor. This also permits the system to calibrate the front to rear speed ratio which is designated as the base or 1.00 speed. Once these values are determined, the system can proceed to automatically calibrate the front to rear speed ratios for non-straight ahead conditions.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering angles and stored information including steering angles and corresponding front to rear wheel speed ratio values, a method of automatically calibrating the control unit comprising:

determining if the vehicle has been in a straight ahead steering mode for at least a certain time period;

determining if a speed of the vehicle is greater than a threshold speed;

replacing at least a portion of the stored information if the vehicle has been in said steering mode for at least said certain time period and if the speed of the vehicle is greater than said threshold speed;

generating an average steering angle value derived by averaging an old steering angle value with a current steering angle value, if the vehicle has been in a straight ahead travel mode for at least a certain time period; and preventing replacement of the stored information if a magnitude of the average steering angle value is greater than a certain value.

2. The method of claim 1, wherein:

the replaced information relates to a front to rear wheel speed ratio.

3. The method of claim 1, further comprising:

periodically generating front to rear wheel speed ratio values from the speed sensors, the portion of the stored information being replaced comprises a new front to rear wheel speed ratio value which is an average value derived by averaging an old front to rear wheel speed ratio value with a current front to rear wheel speed ratio value.

4. The method of claim 1, wherein:

periodically generating front to rear wheel speed ratio values from the speed sensor, the portion of the stored information being replaced comprises a new front to rear wheel speed ratio value which is a weighted average value derived by averaging a plurality of old front to rear wheel speed ratio values with a current front to rear wheel speed ratio value, wherein the old ratio value is weighted heavier than the current ratio value.

5. The method of claim 1, wherein:

the predetermined steering mode is a turning steering mode.

6. The method of claim 5, further comprising:

preventing said replacing if the controllable device is being operated.

7. The method of claim 5, further comprising:

preventing said replacing unless a certain time period has expired.

8. The method of claim 5, further comprising:

preventing said replacing unless a certain time period has expired; and preventing said replacing if the controllable device is being operated.

9. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering angles and stored information including steering angles and corresponding front to rear wheel speed ratio values, a method of automatically calibrating the control unit comprising:

periodically obtaining steering angle values, from the steering angle sensor;

periodically obtaining front and rear wheel speed values from the speed sensors;

periodically generating new front to rear wheel speed ratio values from the obtained speed values;

replacing one of the stored front to rear wheel speed ratio values with one of the new ratio values if the steering angle values indicate that the vehicle has been in a straight ahead travel mode for at least a certain time period; and preventing replacement of the stored front to rear wheel speed ratio value unless the vehicle is traveling faster than a certain threshold speed.

10. The method of claim 9, wherein:

the replaced value is a stored front to rear wheel speed ratio value corresponding to straight ahead travel.

11. The method of claim 9, further comprising:

preventing replacement of the stored front to rear wheel speed ratio value if the controllable device is being operated.

12. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering angles and stored information including steering angles and corresponding front to rear wheel speed ratio values, a method of automatically calibrating the control unit comprising:

determining if the vehicle has been in a predetermined steering mode for at least a certain time period;

determining if a speed of the vehicle is greater than a threshold speed;

replacing at least a portion of the stored information if the vehicle has been in said steering mode for at least said certain time period and if the speed of the vehicle is greater than said threshold speed; and periodically generating front to rear wheel speed ratio values from the speed sensor, the portion of the stored information being replaced comprises a new front to rear wheel speed ratio value which is a weighted average value derived by averaging a plurality of old front to rear wheel speed ratio value with a current front to rear wheel speed ratio value, wherein the old ratio value is weighted heavier than the current ratio value.

13. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering ankles and stored information including steering angles and corresponding front to rear wheel speed ratio values, a method of automatically calibrating the control unit comprising:

determining if the vehicle has been in a turning steering mode for at least a certain time period;

determining if a speed of the vehicle is greater than a threshold speed;

replacing at least a portion of the stored information if the vehicle has been in said steering mode for at least said certain time period and if the speed of the vehicle is greater than said threshold speed; and preventing said replacing if the controllable device is being operated.

14. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering angles and stored information including steering angles and corresponding front to rear wheel speed ratio values, a method of automatically calibrating the control unit comprising:

determining if the vehicle has been in a turning steering mode for at least a certain time period;

determining if a speed of the vehicle is greater than a threshold speed; and replacing at least a portion of the stored information if the vehicle has been in said turing steering mode for at least said certain time period and if the speed of the vehicle is greater than said threshold speed; and preventing said replacing unless a certain time period has expired.

15. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering angles and stored information including steering angles and corresponding front to rear wheel speed ratio values, a method of automatically calibrating the control unit comprising:

determining if the vehicle has been in a turning steering mode for at least a certain time period;

determining if a speed of the vehicle is greater than a threshold speed;

replacing at least a portion of the stored information if the vehicle has been in said turning steering mode for at least said certain time period and if the speed of the vehicle is greater than said threshold speed;

preventing said replacing unless a certain time period has expired; and preventing said replacing if the controllable device is being operated.

16. In a vehicle having steerable front wheels, an interaxle differential for transmitting torque from an engine to the front wheels and to rear wheels, the differential having a controllable device operable to control a ratio of front wheel speed to rear wheel speed, a front wheel speed sensor, a rear wheel speed sensor, a steering angle sensor, and a control unit for controlling the controllable device as a function of sensed steering angles and stored information including steering angles and corresponding front to rear wheel speed ratio values, a method of automatically calibrating the control unit comprising:

periodically obtaining steering angle values, from the steering angle sensor;

periodically obtaining front and rear wheel speed values from the speed sensors;

periodically generating new front to rear wheel speed ratio values from the obtained speed values;

one of the stored front to rear wheel speed ratio values with one of the new ratio values if the steering angle values indicate that the vehicle has been in a straight ahead travel mode for at least a certain time period; and preventing replacement of the stored front to rear wheel speed ratio value if the controllable device is being operated.

* * * * *